Figure 1:
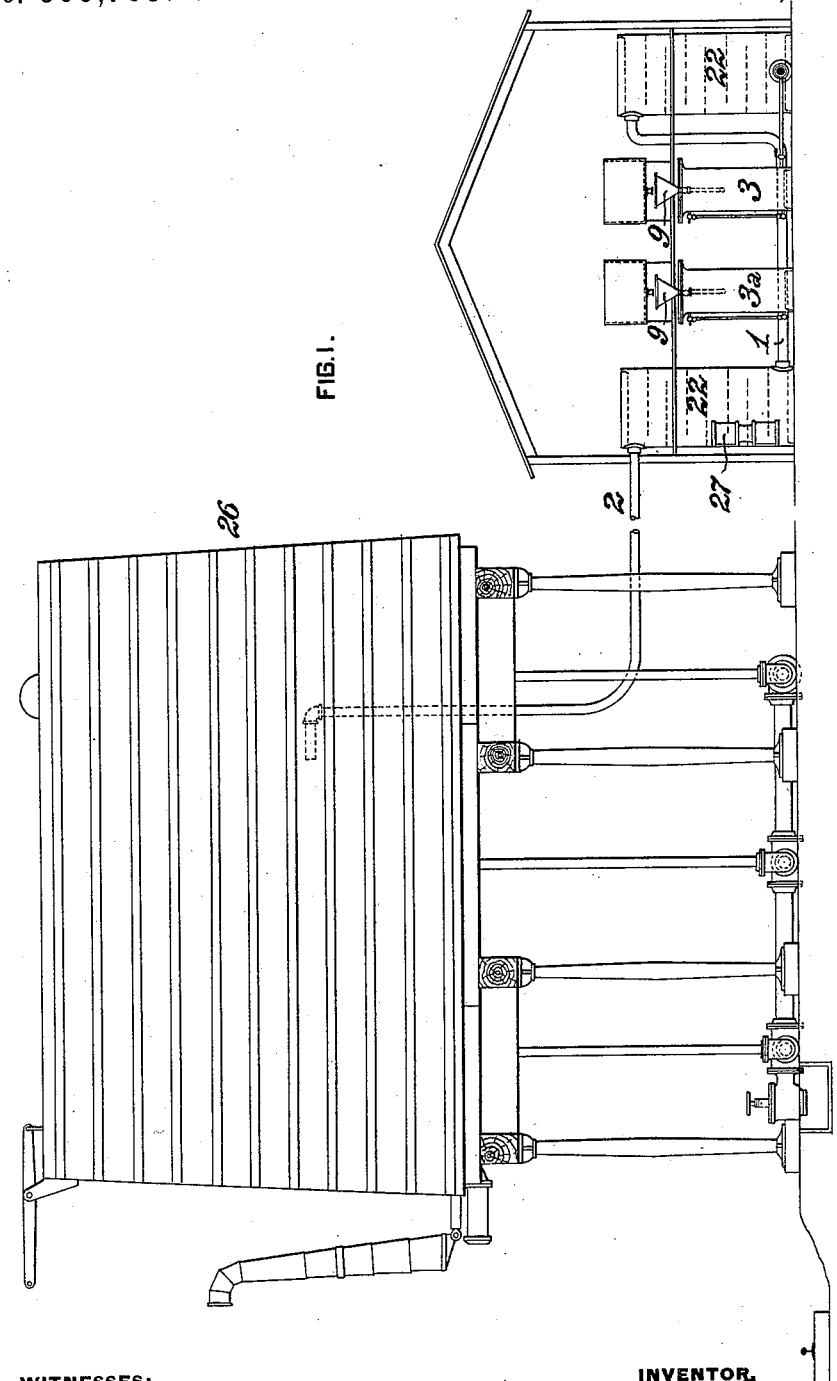

(No Model.)
2 Sheets—Sheet 1.

H. STILLMAN.
APPARATUS FOR PURIFYING WATER.

No. 595,793.
Patented Dec. 21, 1897.

WITNESSES:
Chas. F. Miller.
Jas. E. Herron.

INVENTOR,
Howard Stillman,
by J. Snowden Bell,
Att'y.

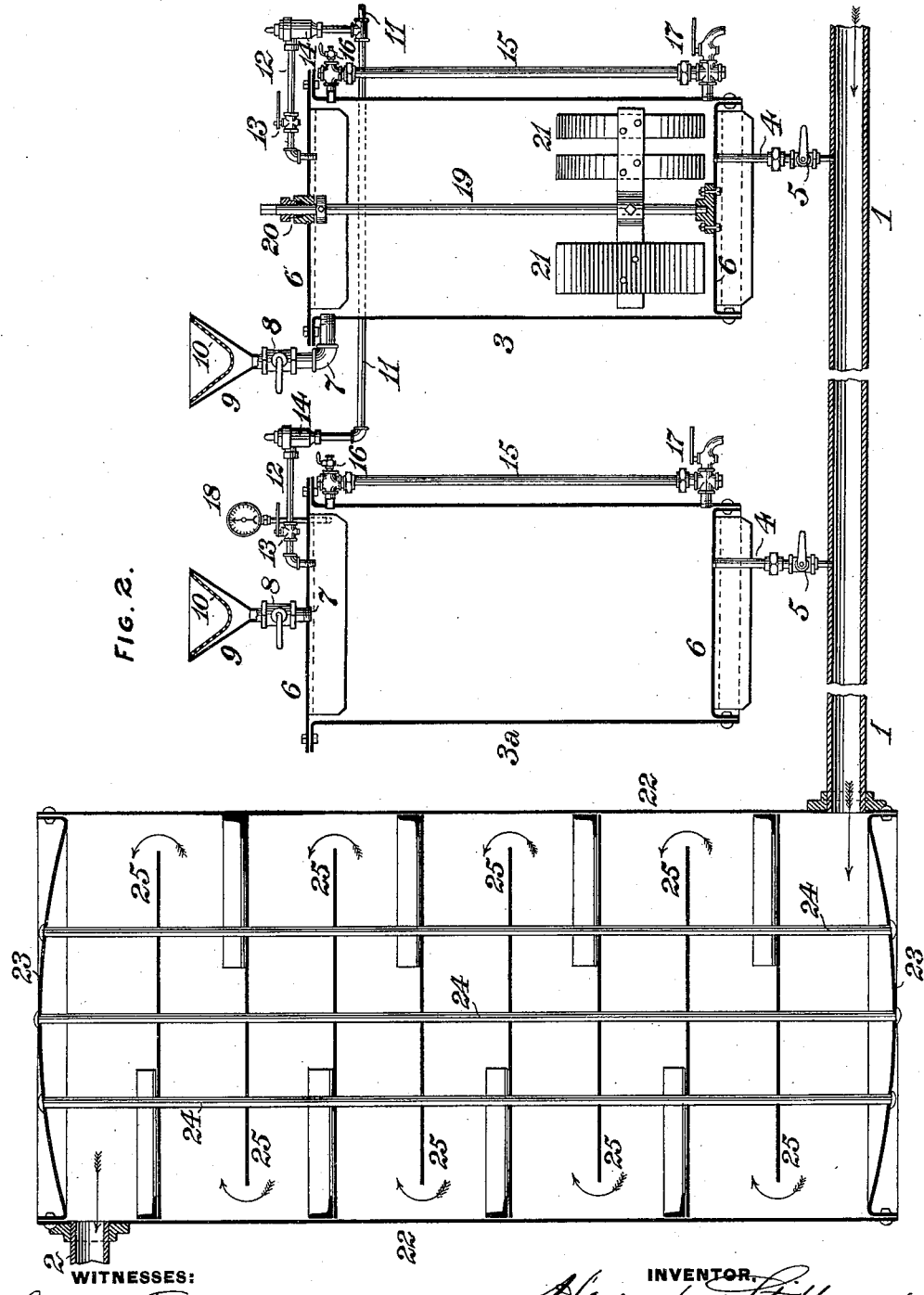

United States Patent Office.

HOWARD STILLMAN, OF SACRAMENTO, CALIFORNIA.

APPARATUS FOR PURIFYING WATER.

SPECIFICATION forming part of Letters Patent No. 595,793, dated December 21, 1897.

Application filed January 6, 1897. Serial No. 618,197. (No model.)

*To all whom it may concern:*

Be it known that I, HOWARD STILLMAN, of Sacramento, in the county of Sacramento and State of California, have invented a certain new and useful Improvement in Apparatus for the Purification of Water, of which improvement the following is a specification.

My invention relates to the purification of water by the addition thereto of chemicals by which the precipitation of foreign matter in solution is effected; and its object is to enable the volume and rate of supply of the purifying agent or agents to be regulated with greater accuracy than heretofore and to simplify and reduce the compass of the purifying plant.

To this end my invention, generally stated, consists in the combination of a water-supply main, a chemical tank, an air-supply pipe leading into the chemical-tank, and a pressure-regulating valve controlling the air-supply pipe; also in the combination of a water-supply main, a chemical-tank, and a circulating-tank.

The improvement claimed is hereinafter fully set forth.

In the accompanying drawings, Figure 1 is a view in elevation of an apparatus for the purification of water, illustrating an application of my invention; and Fig. 2, a vertical longitudinal central section, on an enlarged scale, through the chemical-tanks and a circulating-tank of the same.

In the practice of my invention the water to be treated is drawn from a well, stream, or other source of supply and forced under hydraulic pressure through a supply-main to a precipitating or settling tank. In the traverse of the water through the supply-main it is charged with chemicals of such character as will produce a reaction by which the foreign matters which it holds in solution are precipitated in the settling-tank. The introduction of chemicals for this purpose is not in and of itself new; but as heretofore practiced, so far as my knowledge and information extend, it has been found difficult to properly regulate the volume and rate of their supply, and, further, settling-tanks of undesirably large size provided with mechanical agitators have generally been found necessary to promote effective precipitation.

Under my invention the first of the above-stated objections is avoided by a novel method of effecting and controlling the supply of chemicals to the column of water passing through the supply-main by introducing the chemicals by the forcing action of an unbalanced air-pressure and regulating the same proportionately to the hydraulic pressure in the main, so as to effect the supply of chemicals at a uniform rate of flow. The necessity of large settling-tanks and mechanical agitators is obviated by passing the mixture of water and chemicals through a circulating-tank, in which it is caused to make a number of traverses in alternately-reversed directions, thereby checking its flow through the water-supply system and affording a longer period of chemical action, as well as rendering available the force of gravity in promoting the same, prior to the delivery of the mixture to the settling-tank.

In the apparatus shown in the drawings, which is one that has been found in practical operation to be desirably suited to carry on the process and attain the results above specified, the water which is to be purified is forced under hydraulic pressure, obtained either from a pumping-station or a gravity supply, through a supply-main 1, the outlet or delivery portion or section 2 of which leads to a suitable settling or precipitating tank 26, which does not in and of itself form part of my invention and which may be of any suitable form and dimensions. A chemical-tank 3, one or more of which may be employed, is located in any convenient position relatively to the supply-main 1, preferably at a higher level, and is connected therewith by a feed-pipe 4, controlled by a cut-out cock 5. For convenience of connection and adjustment one of the sections of the feed-pipe may be made of rubber hose or other suitable flexible material. The chemical-tank is closed by tight end plates or heads 6 and is provided at or near its top with a filling-pipe 7, controlled by a cock 8 and having at its upper end a funnel 9, protected by a strainer 10. An air-supply pipe 11, leading from a reservoir, a compressor 27, or other source of compressed air, is connected by a branch pipe 12, controlled by a cut-out cock 13, with the chemical-tank 3, and a pressure regulating or reducing valve 14 of any suitable and preferred construction is interposed between two of the sections of the branch pipe 12. A glass gage-tube 15, having an upper bleeder-cock 16 and a lower drain-cock 17, is connected to the outside of the chemical-tank, and an air-pressure gage 18 may also be connected thereto or to either one of the chemical-tanks where more than one are employed.

The apparatus illustrated is one which is adapted for use with water requiring treatment with more than one chemical, and two chemical-tanks 3 3ᵃ are therefore employed, one of which, 3, is designed for the reception of milk of lime and the other, 3ᵃ, for that of a solution of carbonate of soda. The lime-tank 3 is provided with a stirrer, consisting of a vertical shaft 19, which passes through a stuffing-box 20 in the head of the tank and carries a series of stirring-blades 21. The stirrer-shaft may be rotated by a suitable independent motor of any preferred construction or by a belt or gearing from a shaft rotated by a prime mover. The soda-tank 3ᵃ and its accessories correspond in all particulars (except as to the absence of a stirrer, which is not required where completely-soluble salts are used) with the tank 3 and its accessories, as above described. The air-pressure gage 18 is in this instance attached to the soda-tank 3ᵃ.

In operation the chemical-tanks are charged with the solutions desired to be introduced into the water passing through the supply-main and the cut-out cocks of the feed-pipes and branch air-supply pipes are opened. The pressure-regulating valves are adjusted to deliver air into the chemical-tanks at such determined proportion of the hydraulic pressure in the supply-main as may be found to afford the proper rate of feed of the solutions from the chemical-tanks thereto, and such rate of feed and admixture with the water in the supply-main is controlled and uniformly maintained by the unbalanced air-pressure acting on the solutions in the tanks.

In order to prolong the period of admixture of the purifying agents with the water prior to its admission to the settling-tank 26, as well as to utilize the force of gravity to promote the commingling of the heavier particles of said agents with the water, the body of water passing through the supply-main 1 is preferably passed through one or more circulating-tanks 22, which are connected at opposite ends to sections of the supply-main, and from which the delivery portion or section 2 of said main leads to the settling-tank. The circulating-tank 22 is closed at its ends by tight heads 23, which may be strengthened by braces 24, extending longitudinally through the tank, and the body of water passing through the tank is caused to make a number of traverses in alternately-reversed directions therein by transverse partitions or diaphragms 25, secured to the inside of the circulating-tank, said diaphragms not extending entirely across the tank, but being cut away on one side, so as to form segmental openings, disposed on alternately opposite sides of the axis of the tank, through which the water passes from one to another of the chambers therein, as indicated by the arrows in the drawings. Where the chemicals employed are heavier than water, the inlet of the main is at the lower end and the outlet at the upper end of the tank, as shown, but if lighter the positions of the inlet and outlet should be reversed.

In the operation of my invention as applied in a water-purifying plant at Port Los Angeles, California, the pumping-station draws from a well at the rate of eleven thousand gallons per hour and delivers water to the supply-main under a constant hydraulic head of ninety-two pounds to the square inch. The air-pressure on the chemical-tank, when kept at about eighty pounds to the square inch, delivers the solution steadily into the supply-main at the rate of nine inches per hour when the pump is working, and this rate has been found to be the proper one for the delivery of the exact proportion of chemicals desired under the conditions of this particular apparatus.

I claim as my invention and desire to secure by Letters Patent—

1. In an apparatus for the purification of water, the combination, substantially as set forth, of a water-supply main, a chemical-tank, an air-supply pipe leading into the chemical-tank, and a pressure-regulating valve controlling the air-supply pipe.

2. In an apparatus for the purification of water, the combination, substantially as set forth, of a water-supply main, a chemical-tank connected thereto, an air-supply pipe leading into the chemical-tank, a pressure-regulating valve controlling the air-supply pipe, a circulating-tank connected to a section of the supply-main on the delivery side of the chemical-tank connection, means for effecting the traverse of water from the supply-main in alternately-reversed directions through the circulating-tank, and an outlet-supply-main section leading from the circulating-tank to a connection with a settling or precipitating tank.

HOWARD STILLMAN.

Witnesses:
W. J. SMALL,
WILLIAM W. RHOADS.